United States Patent [19]
Swann et al.

[11] Patent Number: 5,623,754
[45] Date of Patent: Apr. 29, 1997

[54] APPARATUS FOR FACILITATING THE DETACHMENT OF AN ELEMENT FROM AN OBJECT

[75] Inventors: George R. Swann, Gibsonia; Edward S. Paris, Allison Park, both of Pa.

[73] Assignee: Chick Machine Tool, Inc., Warrendale, Pa.

[21] Appl. No.: 437,031

[22] Filed: May 8, 1995

Related U.S. Application Data

[63] Continuation-in-part of Ser. No. 300,375, Sep. 2, 1994, which is a continuation-in-part of Ser. No. 192,431, Feb. 7, 1994, abandoned, which is a continuation of Ser. No. 955,361, Oct. 1, 1992, abandoned.

[51] Int. Cl.$^6$ .................................................. B25B 27/14
[52] U.S. Cl. .................. 29/281; 29/281.6; 29/284; 29/239; 29/464; 269/900
[58] Field of Search ................. 29/238, 239, 525.11, 29/243.53, 464, 281.1, 281.6, 284; 269/88, 96, 900; 403/370, 365

[56] References Cited

U.S. PATENT DOCUMENTS

| | | | |
|---|---|---|---|
| 2,560,413 | 7/1951 | Carlson | 29/464 |
| 2,868,339 | 1/1959 | Lazarowicz | 29/464 |
| 2,889,396 | 6/1959 | Bode et al. | 29/464 |
| 3,203,082 | 8/1965 | Robbins | 29/525.11 X |
| 4,089,613 | 5/1978 | Babbitt, Jr. | 403/388 |
| 4,121,817 | 10/1978 | Pavlovsky | 269/296 |
| 4,585,217 | 4/1986 | Erickson | 269/56 |
| 4,711,437 | 12/1987 | Longenecker | 269/91 |
| 4,834,358 | 5/1989 | Okolischan et al. | 269/309 |
| 4,966,350 | 10/1990 | Chick | 267/154 |
| 4,968,012 | 11/1990 | Haddard et al. | 269/88 |
| 4,974,308 | 12/1990 | Nimberger | 29/525.1 |
| 5,129,637 | 7/1992 | Ito et al. | 269/231 |
| 5,374,145 | 12/1994 | Mairesse et al. | 29/525.11 |

*Primary Examiner*—Peter Vo
*Assistant Examiner*—Khan Nguyen
*Attorney, Agent, or Firm*—Kirkpatrick & Lockhart LLP

[57] ABSTRACT

Apparatus for separating a member that is attached to an object within a predetermined degree of positioning accuracy by fasteners that can selectively engage and disengage the object. The apparatus comprises at least one biasing member positioned between at least one portion of the member and the object to bias the member away from the object when the fasteners are disengaged from the object.

9 Claims, 10 Drawing Sheets

APPARATUS FOR FACILITATING THE DETACHMENT OF AN ELEMENT FROM AN OBJECT

BACKGROUND OF THE INVENTION

This is a continuation-in-part application of U.S. patent application Ser. No. 08/300,375, filed Sep. 2, 1994, which is a continuation-in-part application of U.S. patent application Ser. No. 08/192,431, filed Feb. 7, 1994, now abandoned, which was a continuation of U.S. patent application Ser. No. 07/955,361, filed Oct. 1, 1992, now abandoned.

FIELD OF THE INVENTION

The present invention relates to workholding apparatuses and, more particularly, is directed to apparatus for positioning a stationary clamping element on a precision vise-like workholder.

DESCRIPTION OF THE INVENTION BACKGROUND

There are a number of known methods for accurately positioning a member on a surface of an object. For example, FIGS. 1 and 2 illustrate a known method for positioning a member 212 on an object 214 having a planar surface 216. As shown in FIGS. 1 and 2, two spaced-apart, round pins 218 are attached to the member 212 such that they extend therefrom to be received in corresponding round holes 220 provided in the object 214. To ensure that the pins 218 can be inserted into the holes 220, the distance "X" between the centers of the pins 218 and the distance "Y" between the centers of the holes 220 must be precisely controlled so that those distances are substantially equal. Such precision machining is costly and time consuming. As such, to accommodate slight variations between those distances, which can result in misalignments between the pins 218 and the holes 220, the holes 220 are typically fabricated with larger diameters than the outside diameters of the pins 218. However, that action can lead to positioning inaccuracies depending upon the magnitude of the clearance provided between the pins 218 and their corresponding holes 220. Also, to fasten the member 212 to the object 214 separate threaded bore(s) (not shown) are typically provided in the object 214 that are adapted to receive corresponding capscrew(s) (not shown) that extend through bores (not shown) provided in the member 212. Such fastening arrangement requires the clearance between the threaded capscrew and the bore in member 212 to be larger than the tolerances between the pins 218 and the bores 220 to ensure that the positioning of the member 212 relative to the object is solely controlled by the pin and bore arrangement.

Another known positioning method for positioning an object 312 on a member 314 having a planar surface 316 is illustrated in FIGS. 3 and 4. When using that method, two round holes 320 are provided in the object 314. A round pin 318 and a "diamond" shaped pin 322 are attached to the object 312 such that they extend therefrom. Such diamond shaped pins 322 typically have their lower end portions configured to a so-called diamond shape by machining the cylindrical surface of the pin on opposite sides, leaving only small arcs spaced on opposite sides on the pin at the original diameter of the pin. Slight variations between the distance "X'" between the centers of pin 318 and diamond shaped pin 322 and the distance "Y'" between the centers of the round holes 320 along a reference line "Z—Z" connecting the center points of the bores 320 is largely accommodated by the tapered sides 324 of the diamond shaped pin 322 as long as the line "W—W" connecting the mid-points of the arcuate faces of the diamond pin 322 are substantially perpendicular to line "Z—Z".

Over the years, the above-mentioned positioning methods have been used to locate a fixture or other workholding device on a support member such as a tooling plate or grid plate during high precision machining operations. For example, U.S. Pat. No. 4,585,217 to Erickson teaches the use of differently shaped pins for aligning a tooling block adapted to support one or more workpieces thereon on a planar base plate that is attached to a rotary table of a computer numerically controlled machining device. Two of the pins that are used each have a dome-shaped upper portion and a cylindrical lower stem that is adapted to be received in a corresponding bore in the base plate. The tooling block has at least two alignment bores that are adapted to receive the upper dome-shaped portions of those pins therein to facilitate initial alignment of the block on the base plate. Another pin, having a lower cylindrical stem portion adapted to be received in a corresponding bore in the base plate and an upper portion having a frusto-conical shape adapted to be received in a corresponding bore provided in the block is also used to facilitate alignment of the block on the plate. In addition, another pin that also has a cylindrical lower stem portion adapted to be received in corresponding bore in the plate and a diamond-shaped upper portion adapted to be received in a corresponding bore in the block is used. That collection of pins is used to precisely locate the tooling block on the base plate.

A somewhat similar arrangement of pins is taught in U.S. Pat. No. 4,834,358 to Okolfschan et al. In that device, adapter members are attached to a grid plate and are sized to support a workpiece thereon at a desired height. Locating pins, each having a locating portion and a cylindrical stem portion that is adapted to be received in a corresponding bushing provided in the adapter are provided to locate the workpiece in a predetermined position. The locating portion of each pin is adapted to be received in corresponding bores provided in the workpiece. Each pin may be further provided with a shoulder that cooperates with a corresponding screw arrangement to prevent the pin from rotating in its corresponding bushing. One or more of the pins may be provided with a "diamond" cross-sectional shape.

Both of the locating pin arrangements disclosed in the patents mentioned immediately above have inherent inaccuracy problems. In particular, the locating pins each have cylindrical "stem" portions that, in one case, serve to locate the pins in a base member and, in the other case, serve to locate the pins in an adaptor member that is attached to a base plate. Thus, the degree of positioning accuracy of one member (i.e., a tooling block or a workpiece) relative to the other member (i.e., a base plate or an adaptor attached to a base plate) is directly dependent upon the accuracy of each of the cylindrical pin stems and the corresponding bore in which it is to be received.

Every machining process has a certain amount of inaccuracy associated with it due to, perhaps, limitations of the apparatus used to machine the bore, wear of that apparatus' components or the particular machining method employed. As such, each bore will have a range of diameters (i.e., a tolerance) that could result from that particular machining apparatus or process, each of which would be deemed acceptable, in view of the inherent inaccuracies associated with that apparatus and/or process. Similar inaccuracies are also encountered when machining the cylindrical lower stems of the locating pins. Thus, the accuracy of the pin relative to the first member in which its lower cylindrical stem portion is received will depend upon the accuracy of the pin and the accuracy of the bore into which it is inserted. For example, a pin member having a diameter of 0.500" and a tolerance of ±0.002" that is adapted to be inserted into a bore of 0.504" having a tolerance of ±0.002" could cause the members to be misaligned by as much as 0.004" if the pin diameter is 0.498" and the bore diameter is 0.506".

Likewise, U.S. Pat. No. 4,968,012 to Haddad et al. discloses a modular workpiece holding apparatus for holding a workpiece in a predetermined position. The apparatus includes a base plate that has a plurality of bores therein that each have a lower threaded portion. The apparatus also includes a plurality of support members that each have a mounting base with four bores formed therein. A bushing is secured in each bore in the mounting base such that a portion of each bushing protrudes from its bottom surface. Two bushings that each have a circular exterior portion that protrude from the bottom of the mounting base and two bushings that each have a diamond-shaped exterior portion that protrudes from the mounting base are used to position the mounting base relative to the base plate by inserting the protruding bushings into bores provided in the base plate. The support member is secured to the base plate by threaded fasteners that extend through the bushings to threadedly engage the threaded portion of the bores in the base plate. This arrangement of locating bushings, however, also has the same inaccuracy problems of the pin arrangements that were discussed above. In particular, because the bushings must be inserted into holes provided in the mounting base of each support member, the positioning accuracy of the mounting plate relative to the base plate is dependant upon the accuracy of the outer surfaces of the bushings and the accuracy of the holes in which they are to be inserted.

Also, in those arrangements wherein precisely shaped locating protrusions formed on an object are adapted to be inserted into corresponding bores or hollow bushings in another object, it is typically difficult to separate the objects due to the precision fit created therebetween. Thus, depending upon the size of the individual objects, they usually must be manually manipulated such that the locating protrusions do not bind against the interior surface of the bores in which they are received while the objects are urged apart. Such method of separation is awkward and time consuming.

In view of the foregoing, there is a need for apparatus that can more accurately position an object on the planar surface of a member.

There is a further need for apparatus that can more accurately position stationary clamping elements onto the base member of a precision workholding device.

There is a further need for apparatus that has the above-mentioned attributes and that can minimize the amount of effort and manipulation required to detach the stationary clamping elements from the device.

SUMMARY OF THE INVENTION

In accordance with a preferred form of the present invention, there is provided an apparatus for facilitating the separation of a member that has been attached to an object within a predetermined degree of accuracy. The apparatus is adapted to be used in connection with an object that has locating bores therein that are adapted to receive corresponding locating protrusions on the member and is attached to the object by fastening members that are adapted to selectively engage and disengage the object. In a preferred form, the apparatus comprises at least one biasing member positioned between at least a portion of the member and the object to bias the member away from the object when the fastening members are disengaged therefrom.

It is an object of the present invention to provide apparatus for precisely locating a member on an object having a planar surface within acceptable tolerances that could not, necessarily, be achieved using standard machining practices.

It is another object of the present invention to provide means for attaching a fixed jaw member to the base of a vise-like workholder in a location on the base that is within predetermined acceptable tolerances.

It is still another object of the present invention to provide a means that facilitates easy detachment of the fixed jaw from the workholder.

Accordingly, the present invention provides solutions to the aforementioned problems discussed above. However, these and other details, objects and advantages will become apparent as the following detailed description of the present preferred embodiment thereof proceeds.

BRIEF DESCRIPTION OF THE DRAWINGS

In the accompanying drawings, there are shown present preferred embodiments of the invention wherein like reference numerals are employed to designate like parts and wherein.

DETAILED DESCRIPTION OF THE PREFERRED EMBODIMENTS

Figure 1:
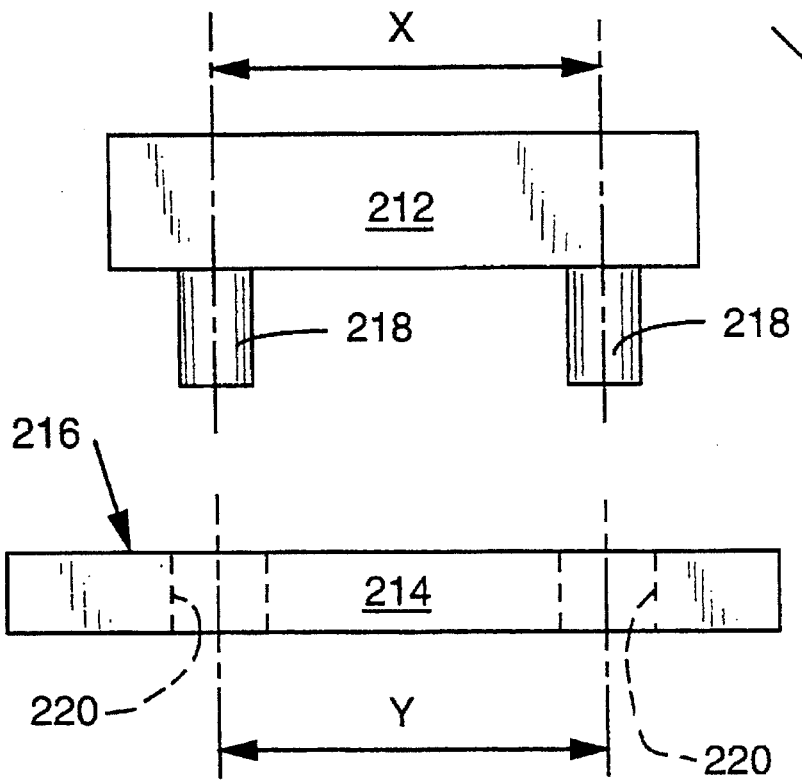
FIG. 1 is an exploded assembly view of a prior method for positioning a member on the planar surface of an object.
Figure 2:
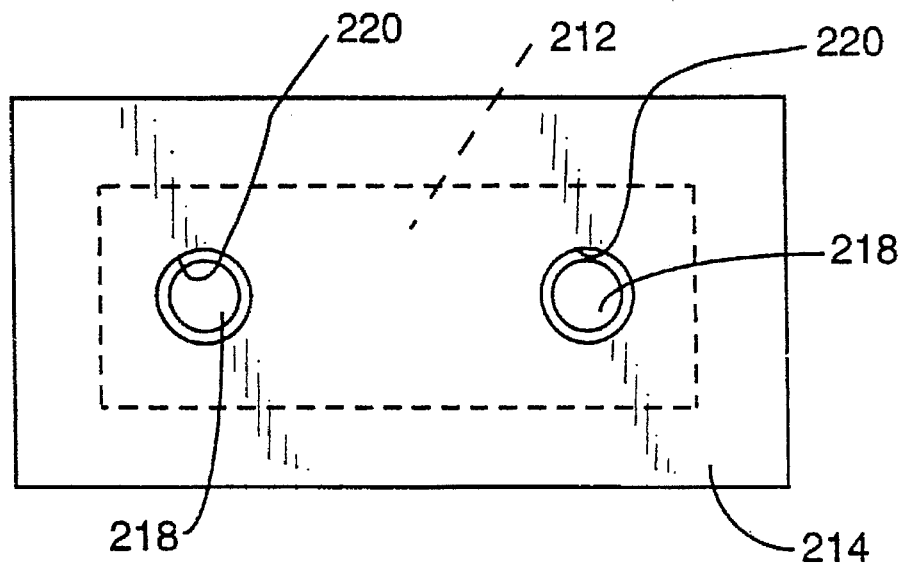
FIG. 2 is a bottom view of the assembly of FIG. 1.
Figure 3:
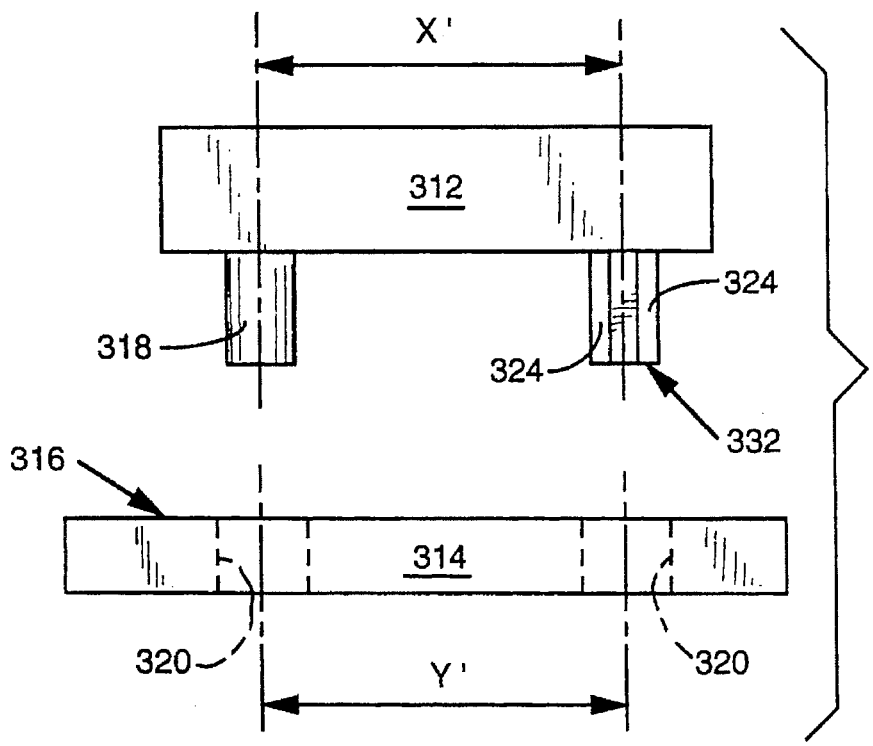
FIG. 3 is an exploded view of another prior method for positioning a member on a planar surface of an object.
Figure 4:
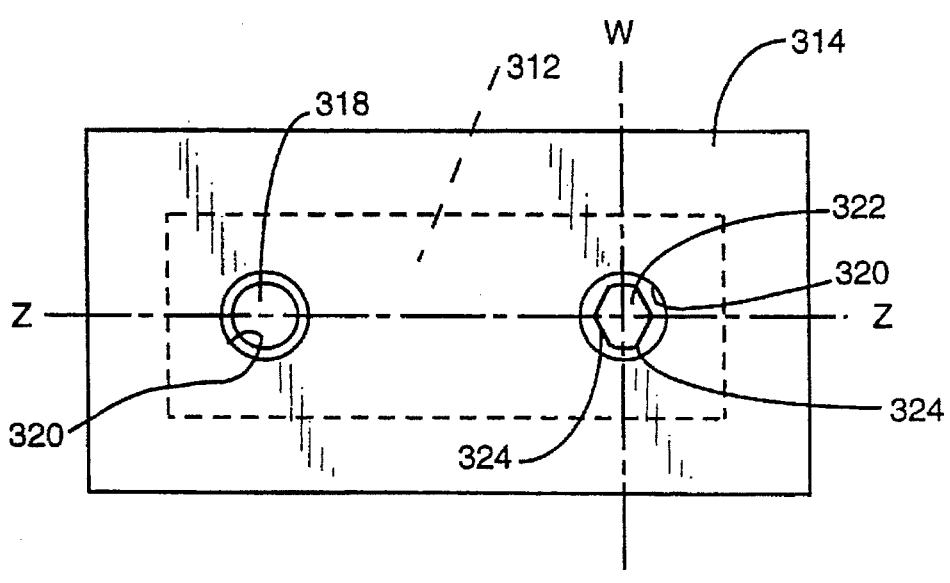
FIG. 4 is a bottom view of the assembly of FIG. 3.
Figure 5:
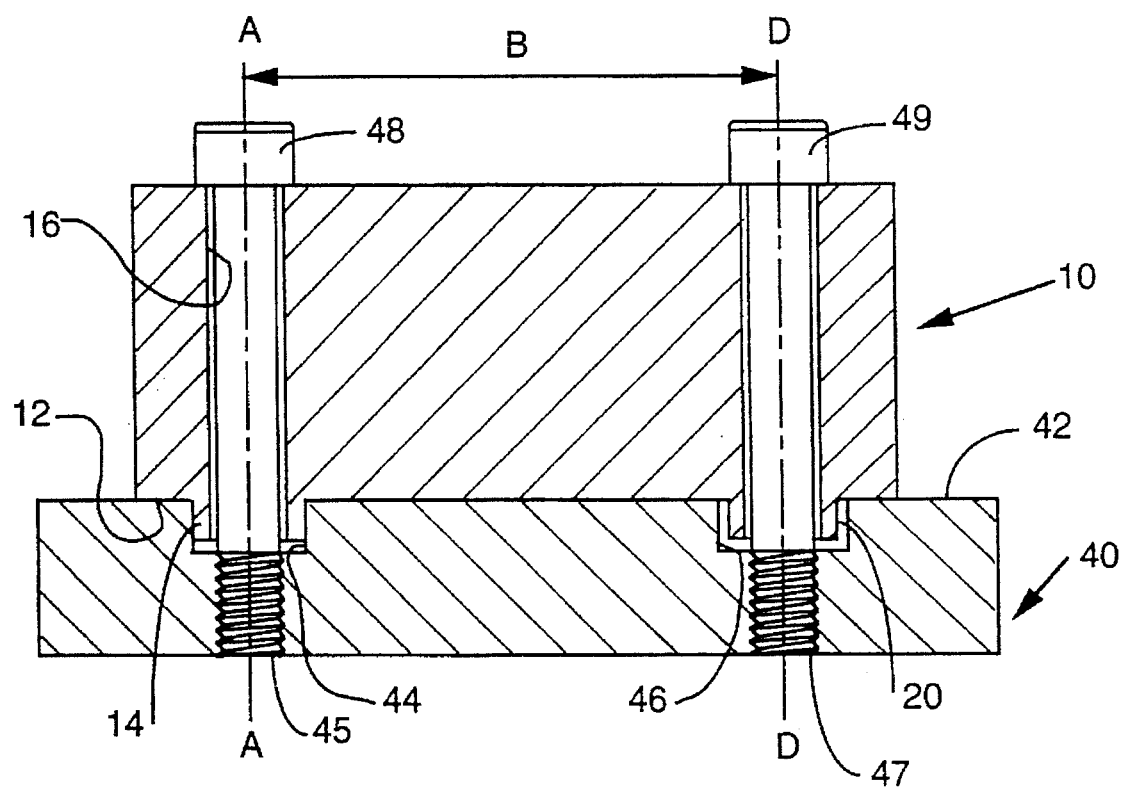
FIG. 5 is cross-sectional assembly view of a member attached to an object using the apparatus of the present invention.
Figure 6:
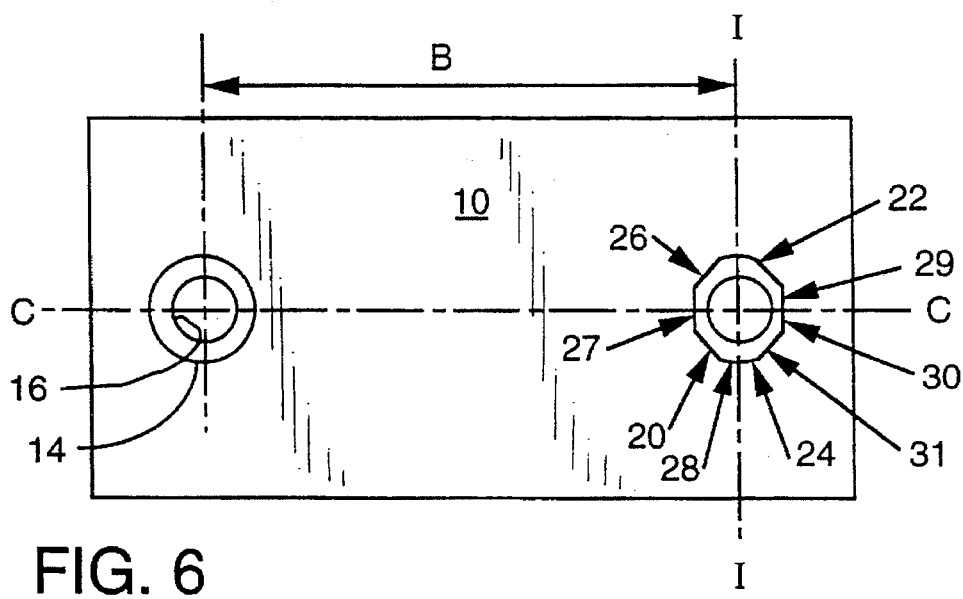
FIG. 6 is a bottom view of the member depicted in FIG. 5.

Referring now to the drawings for the purposes of illustrating the present preferred embodiments of the invention only and not for purposes of limiting the same, FIGS. 5 and 6 illustrate a preferred embodiment of the present invention for precisely positioning a member 10 on a surface 42 of an object 40. It will be appreciated that member 10 may consist of any solid article such as, for example, a stationary clamping member that is adapted to be precisely positioned on a planar surface like a portion of a machine tool or workholding member.

As can be seen in FIG. 5, the member 10 has a mating surface 12 that is adapted to be received on the planar surface 42 of the object 40. A first protrusion 14, preferably having a substantially circular cross-sectional shape, is formed in the mating surface 12 such that it protrudes or extends therefrom. A first bore 16 is provided through the member 10 in a known location such that it is substantially coaxially aligned with the first protrusion 16 along axis "A—A" and extends therethrough in the manner illustrated in FIG. 5.

Spaced a "first" predetermined distance (generally designated as distance "B") along a common longitudinal axis "C—C" on the mating surface 12 is a second "diamond-shaped" protrusion 20 that has an axis "D—D" that is substantially parallel to axis "A—A" of protrusion 14. In a preferred embodiment, arcuate surfaces (22, 24), each preferably about 20 degrees in length, and in no event greater than 179 degrees in length, are preferably formed diametrically opposite each other as shown in FIG. 6. Interconnected non-arcuate surfaces (26, 27, 28, 29, 30, 31), each being closer to axis "D—D" than the arcuate surfaces (22, 24), are preferably provided intermediate the arcuate surfaces (22, 24) as shown in FIG. 6. The skilled artisan will appreciate, however, that other non-arcuate or arcuate intermediate surface arrangements may also be successfully used depending upon the lengths of arcuate surfaces (22, 24).

Figure 7:
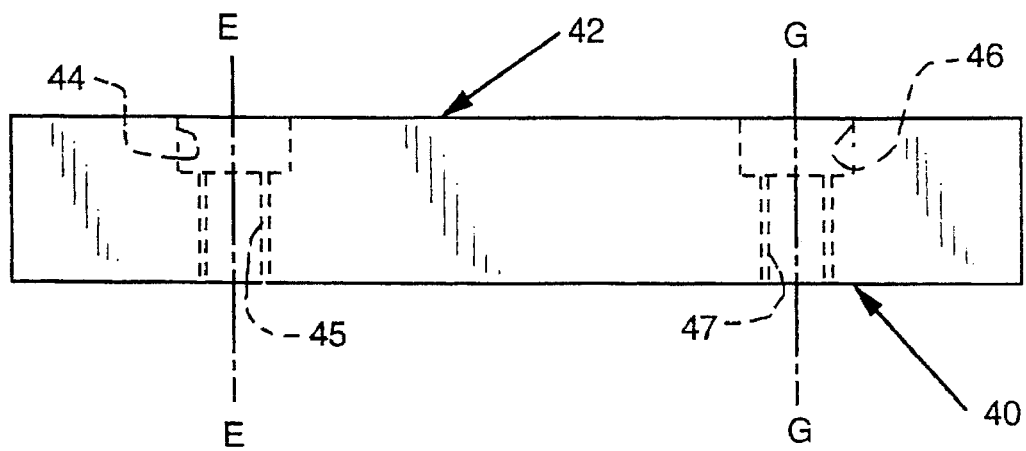
FIG. 7 is a side elevational view of the object depicted in FIG. 5.
Figure 8:
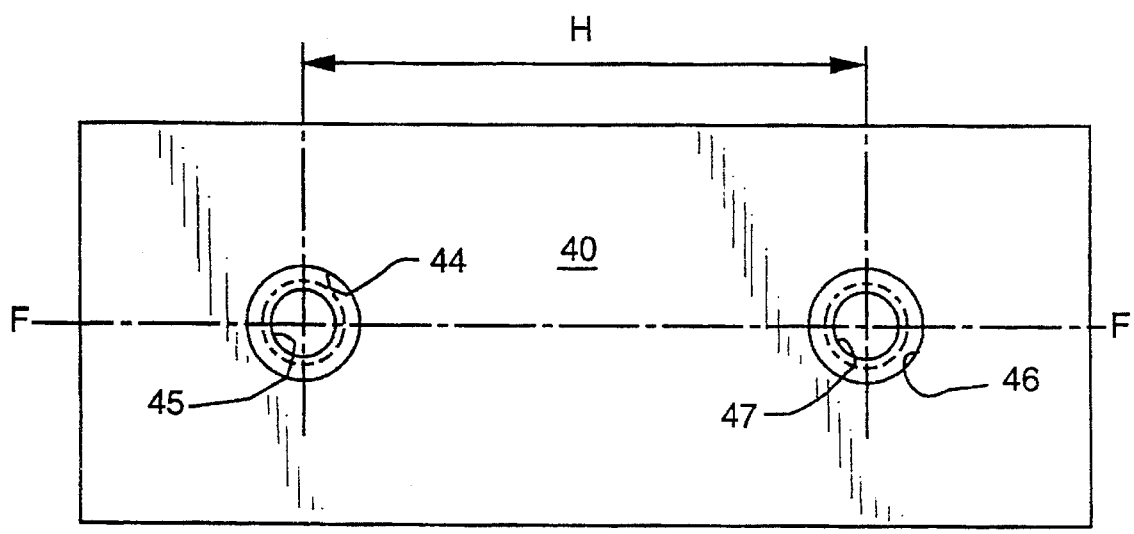
FIG. 8 is a plan view of the object depicted in FIGS. 5 and 7.

A "first" receiving bore 44 having a "first" axis "E—E" is provided in the object 40 such that axis "E—E" extends substantially perpendicularly through a longitudinal reference axis "F—F" provided on the planar surface 42 of the object 40. See FIGS. 7 and 8. A "second" receiving bore 46 that has an axis "G—G" is provided in object 40 a second predetermined distance "H" along the reference axis "F—F" from the first receiving bore 44. Thus, in this embodiment, axes "E—E" and "G—G" are preferably substantially parallel to each other and they are preferably substantially perpendicular to axis "F—F".

To locate the member 10 on the planar surface 42 of the object 40, the member 10 is so positioned such that the mating surface 12 is brought into confronting relationship with the planar surface 42 of the object to thereby enable the first protrusion 14 and the second protrusion 20 to be simultaneously inserted into the first receiving bore 44 and the second receiving bore 46, respectively. To removably attach the member 10 to the object 40, the first receiving bore 44 is provided with a "first" threaded portion 45 and the second receiving bore 46 is provided with a "second" threaded portion 47. A "first" fastening member, preferably a capscrew 48, is inserted through first axial bore 16 to be threadedly engaged with the first threaded portion 45. Likewise, a second fastening member, preferably a capscrew 49, is inserted through a second axial bore 21 that extends through the member 10 and the protrusion 20 to be threadedly engaged with the second threaded portion 47 of second receiving bore 46. The skilled artisan will appreciate, however, that other suitable fasteners such as, for example, bolts, pins, etc. may also be used.

The skilled artisan will also appreciate that the positioning accuracy of the member 10 relative to the object 40 is dependent upon the position of the protrusions (14, 20) on the member 10 and the positions of the first and second receiving bores (44, 46) in the object 40. More specifically, the location of protrusion 14 and the location of the first receiving bore 44 establish the location of member 10 relative to the reference axis "F—F" on the object 40. Of course, each of those elements (i.e., the protrusion 14 and the first receiving bore 44) have a tolerance, the magnitude of which may be dictated by such factors as (i) the ultimate acceptable degree of positioning accuracy required between the member 10 and the object 40 and (ii) the accuracy limitations and costs associated with machining those elements to the tolerances necessary to achieve such positioning accuracy. The skilled artisan will further understand that the positions of protrusion 20 and the corresponding second receiving bore 46 relative to protrusion 14 and the first receiving bore 44 serve to define the degree of rotational accuracy that member 10 will have about axis "E—E". See FIG. 7. It has been found, however, that when the second protrusion 20 is so angularly arranged on the mating surface 12 of the member 10 such that a line "I—I" connecting the centers of the arcuate surfaces (22, 24) is perpendicular to the reference axis "F—F" when the protrusions (14, 20) are received in bores (44, 46), respectively, the distances "B" and "H" can vary up to about four times the amount such distances could normally vary if protrusion 20 had a circular cross-sectional shape.

As was previously discussed hereinabove, the present positioning method is well adapted for positioning and affixing a stationary clamping member onto the base member of a workholding apparatus. For example, as described below and illustrated in FIGS. 9–15, the present invention may be used in connection with a vise-like workholding device, generally designated as 50, that is adapted to securely restrain a first workpiece 52 and a second workpiece 54 during various machining operations.

The basic structure of the workholding device 50 is similar to the workholding apparatus described in U.S. Pat. No. 5,022,636, issued Jun. 11, 1991, entitled "Workholding Apparatus", the disclosure of which is herein incorporated by reference. As such, in the present Detailed Description Of The Preferred Embodiments, the basic structure of the workholder 50 will be described in general terms, it being understood that the particular details of the workholder 50 construction, with the exception of those features which are described hereinbelow forming this embodiment of the present invention, may be gleaned from a review of that patent.

Figure 9:
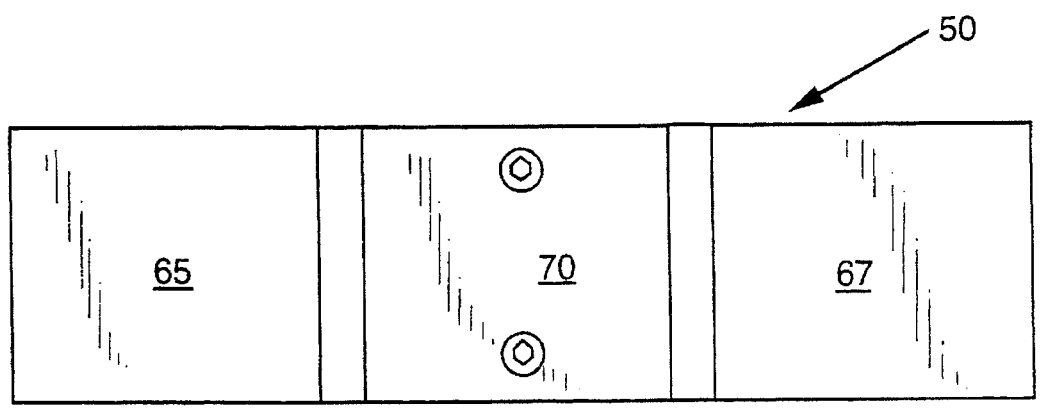
FIG. 9 is a plan view of a precision vise-like workholding device with which the present invention may be used.
Figure 10:
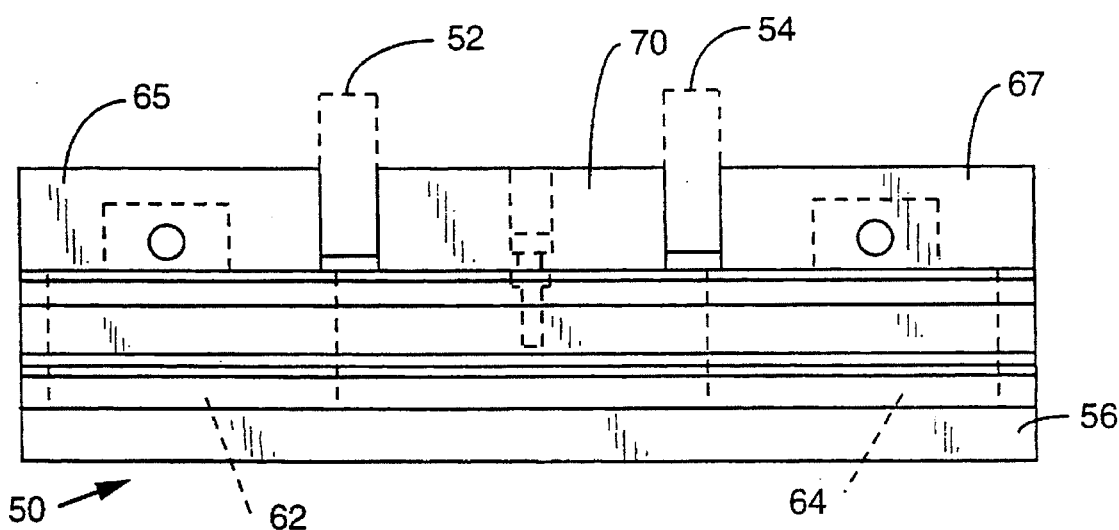
FIG. 10 is side elevational view of the workholding device of FIG. 9.
Figure 12:
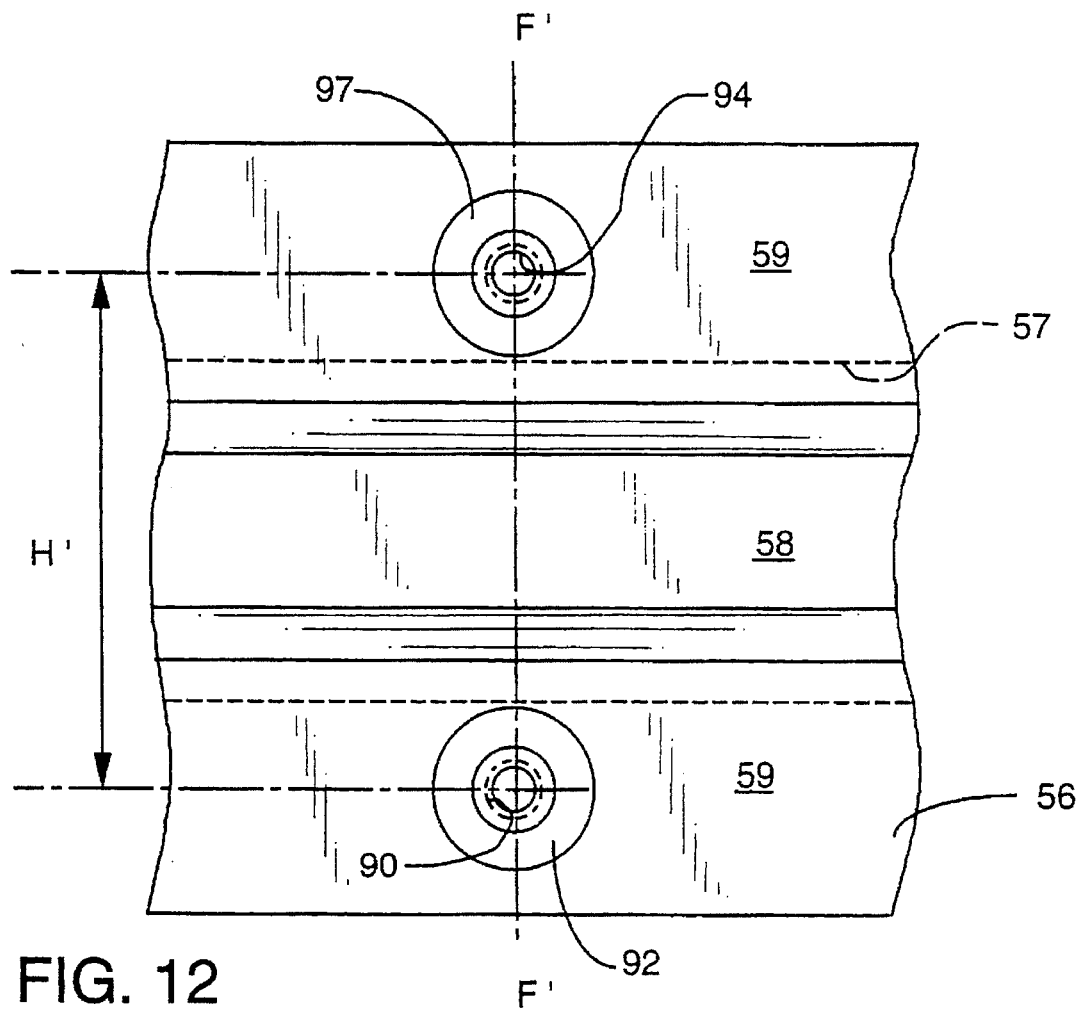
FIG. 12 is a partial plan view of the base of FIG. 11.

The vise-like workholding device 50 generally comprises a base member 56 which is an elongated metallic structure typically fabricated from a high strength aluminum material. As most particularly shown in FIG. 11, a cavity 57 is machined along the longitudinal axis of the base member 56 and defines a slot 58 having two longitudinally extending side rail members 59. In addition, a clamping assembly, generally designated as 60 is provided for movement within the cavity 57 and slot 58. The clamping assembly 60 includes first and second slide members (62, 64) which are slidably received within the slot 58. As shown in FIGS. 9 and 10, a workholding jaw portion 65 is preferably attached to the first slide member 62 and a second workholding jaw portion 67 is preferably attached to the second slide member 64. The workholding jaw portions 65 and 67 may be similar to those workholding jaw portions disclosed in U.S. Pat. No. 5,025,427 entitled "Quick Change Head For Precision Machine Vise" the disclosure of which is herein incorporated by reference. The clamping assembly 60 also includes a screw shaft 66 that is received within the slot 58 in the base member 56. The screw shaft 66 is operably attached to the first and second slide members (62, 64) such that rotational movement of the screw shaft 66 causes the first and second slide members (62, 64) to be selectively moved along slot 58.

A central fixed jaw member 70 is also adapted to be attached to the base 56 between the jaw portions 65 and 67 such that the movable slide members 62 and 64 may move toward and away from the central fixed jaw member 70 to clamp workpieces 52 and 54 therebetween. For example, when the screw shaft 66 is rotated, the first movable slide member 62 is moved relative thereto, thereby causing the first workholding jaw portion 65 to move toward the central jaw member 70 to withhold a first part 52 therebetween. In addition, the rotation of the screw shaft 66 and its movement relative to the first movable slide member 62 causes the second movable slide member 64 to move the second workholding jaw portion 67 toward the fixed central jaw member 70 to engage and restrain a second part 54 therebetween. Because the central jaw member 70 must be accurately positioned and attached to the side rail members 59, the positioning apparatus of the present invention is well-suited to accomplish that task while permitting the central fixed jaw member 70 to be easily removed from the base 56 should it become worn or damaged.

Figure 13:
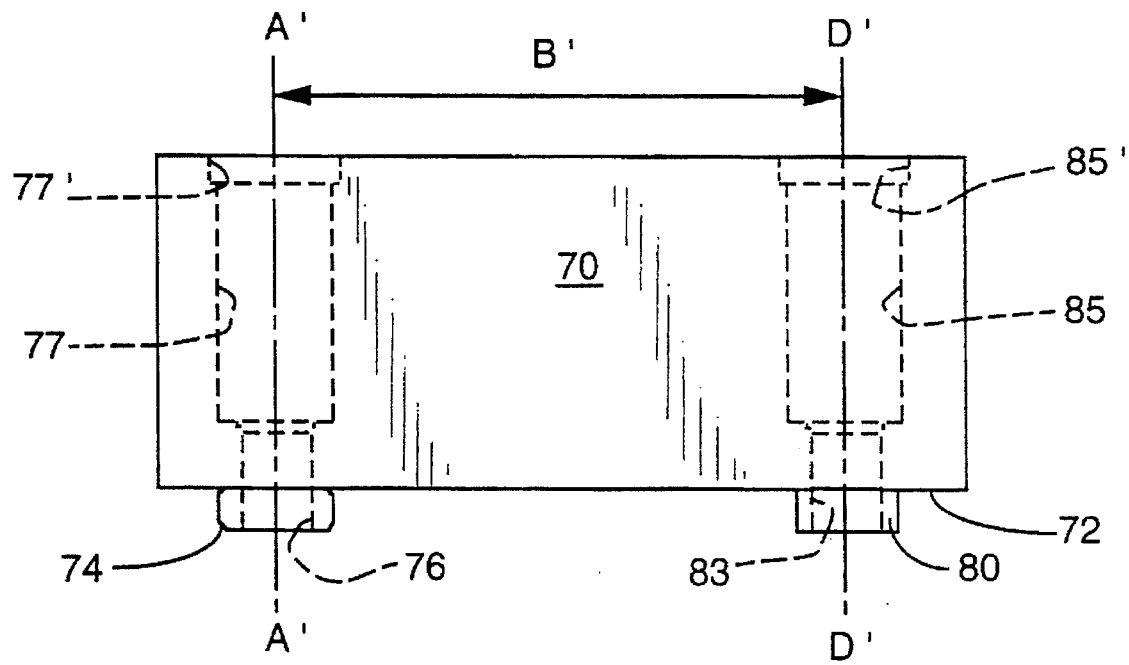
FIG. 13 is an elevational view of the center jaw of the workholding device depicted in FIGS. 9 and 10.
Figure 14:
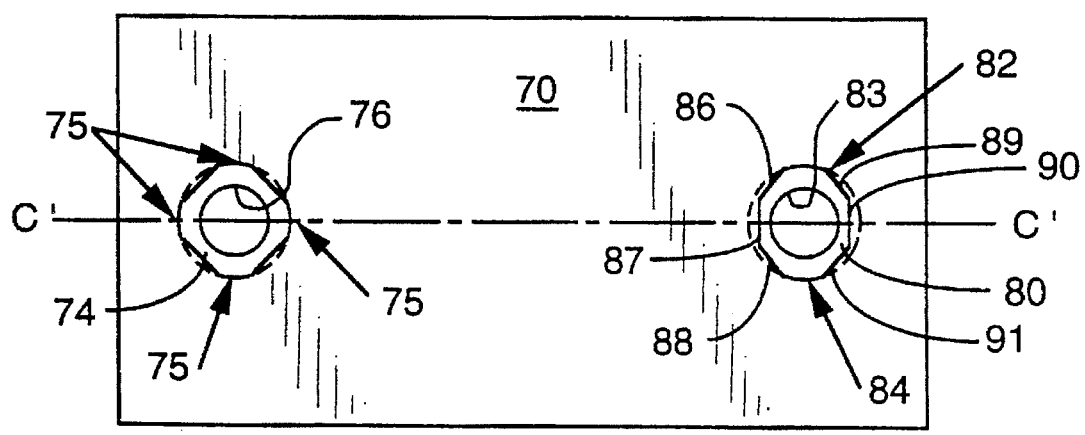
FIG. 14 is a bottom view of the center jaw of FIG. 13.
Figure 15:
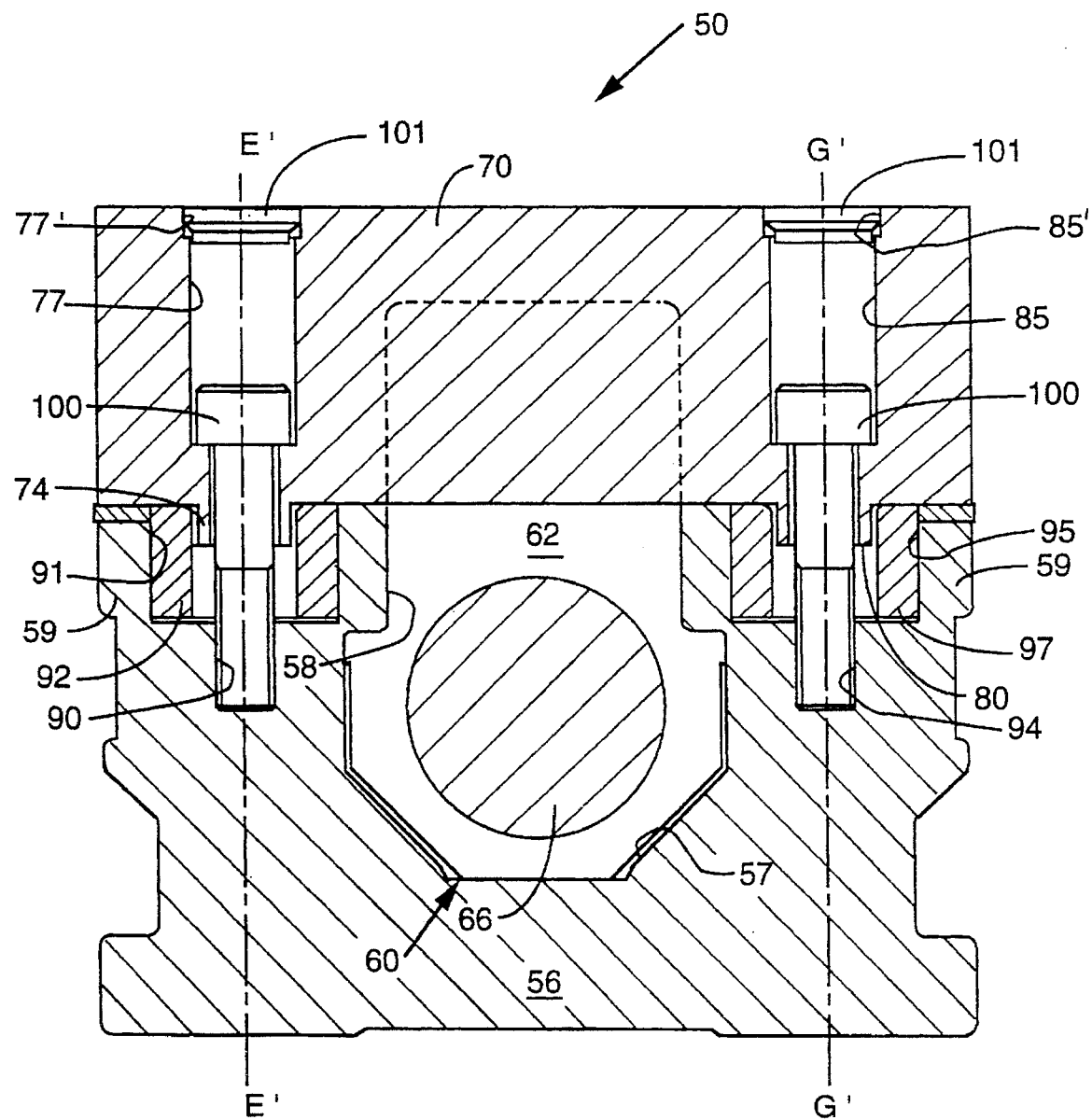
FIG. 15 is a cross-sectional assembly view of the vise-like workholder depicted in FIGS. 9 and 10 with some of the elements thereof depicted in full view to better illustrate the apparatus of the present invention.

More specifically, as shown in FIGS. 13–15, the central fixed jaw member 70 has a mating surface 72 that is adapted to be received on the rail portions 59 of the base 56. A first protrusion 74, preferably having the cross-sectional shape depicted in FIG. 14, is formed in the mating surface 72 such that it protrudes or extends therefrom. As can be seen in FIG. 14, protrusion 74 is preferably provided with four, spaced-apart contact arcs 75 using the fabricating methods described hereinbelow. Also, a first bore 76 is provided through the center jaw 70 at a known location such that it is substantially coaxially aligned with the first protrusion 74 along axis "A'—A'" and extends therethrough in the manner illustrated in FIG. 13. In addition, a first counterbore 77 and a second counterbore 77' are preferably provided in the center jaw 70 such that they are also coaxially aligned with bore 76 on axis "A'—A'".

Spaced a "first" predetermined distance (generally designated as distance "B'") along a common axis "C'—C'" on the mating surface 72 from protrusion 74 is a second protrusion 80 that has an axis "D'—D'" that is substantially parallel to axis "A'—A'" of protrusion 74. In a preferred embodiment, arcuate surfaces (82, 84), each preferably about 20 degrees in length, and in no event greater than 179 degrees in length, are formed diametrically opposite each other as shown in FIG. 14. Interconnected non-arcuate or arcuate surfaces (86, 87, 88, 89, 90, 91), each being closer to axis "D'—D'" than the arcuate surfaces (82, 84), are preferably provided intermediate the arcuate surfaces (82, 84) as shown in FIG. 14. The skilled artisan will appreciate, however, that other non-arcuate or arcuate intermediate surface arrangements may also be successfully used. Also, a first bore 83 is provided through the center jaw 70 such that it is substantially coaxially aligned with the second protrusion 80 along axis "D'—D'" and extends therethrough in the manner illustrated in FIG. 13. In addition, a first counterbore 85 and a second counterbore 85' are preferably provided in the center jaw 70 such that they are also coaxially aligned with bore 83 on axis "D'—D'".

It has been discovered that the protrusions (74, 80) can be advantageously machined into the center jaw 70 as follows. Two protrusions as described above, one round in cross-section and one with only two small arcuate surfaces, corresponding to the protrusions (74, 80) are first machined into the jaw member 70 in their predetermined locations using conventional machining techniques. The outer diameters of these round protrusions may be as much as approximately 0.004" larger than the ultimate desired diameter for each protrusion (74, 80). Thereafter, a die plate fabricated from material that is harder than the jaw member 70 material and having two round apertures that will provide the final desired sizes and center distances for the protrusions (74, 78) is pressed onto the protrusions to "shave" off excess material therefrom and ultimately achieve the desired protrusion size and spacing. To achieve a preferred protrusion diameter accuracy of approximately ±0.0001", it has been found that it is desirable to press the die plate onto the round protrusions at least three successive times. Such manufacturing method is relatively inexpensive when compared to other conventional machining methods capable of achieving similar accuracies.

To attach the center jaw 70 to the base 56, a "first" threaded receiving bore 90, having a "first" axis "E'—E'", is provided in one rail 59 of base 56 such that axis "E'—E'" preferably extends substantially perpendicularly through a reference axis "F'—F'" provided on the base 56. See FIGS. 11 and 12. A "second" receiving bore 94 that has an axis "G'—G'" is provided in the base 56 a second predetermined distance "H'" along the reference axis "F'—F'". Thus, in this embodiment, axes "E'—E'" and "G'—G'" are preferably substantially parallel to each other and they are preferably substantially perpendicular to axis "F'—F'".

Figure 11:
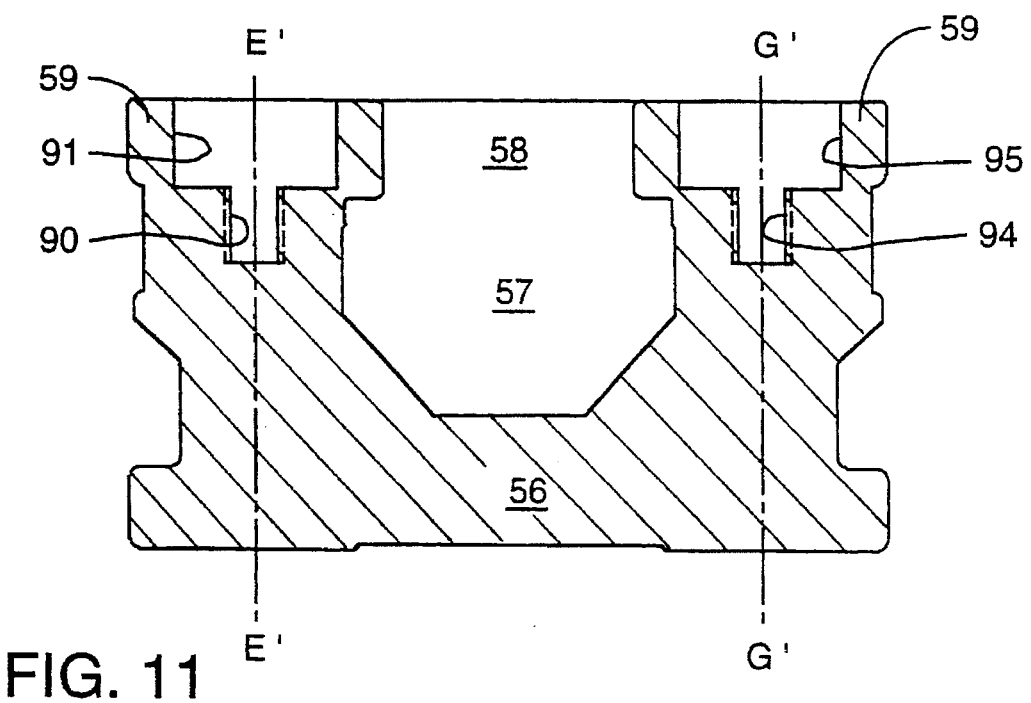
FIG. 11 is a cross-sectional elevational view of the base member of the workholding device depicted in FIGS. 9 and 10.

As can also be seen in FIGS. 11 and 15, a counterbore 91 is coaxially aligned with bore 90 along axis "E'—E'" and is adapted to receive a hollow bushing 92 therein. Similarly, a counterbore 95 is coaxially aligned with bore 94 along axis "G'—G'" and is adapted to receive hollow bushing 97 therein. The bushings (92, 97) are preferably fabricated from hardened steel and are preferably retained within the corresponding counterbores (91, 95) by virtue of an interference fit created between the outer diameter of each bushing and the corresponding counterbore (91, 95). However, those of ordinary skill in the art will appreciate that bushings (92, 97) may be fabricated from a variety of other suitable materials and may be attached to the side rails 59 by any suitable fastening means, or bores without bushings could be provided in the side rails.

To locate the center jaw 70 on the rails 59 of base 56, the center jaw 70 is so positioned such that the mating surface 72 thereof is brought into confronting relationship with the rails 59 of base 56 to enable the first protrusion 74 and the second protrusion 80 to be simultaneously inserted into bushings (92, 97), respectively. To removably attach the center jaw 70 to the rails 59 of base 56, capscrews 100, are preferably inserted through bores (77, 77') and bores (85, 85') and bushings (92, 97) to threadedly engage threaded bores (90, 94). See FIG. 15. Also, to prevent chips and debris from collecting in counterbores (77, 85), resilient bore plugs 101 are preferably removably inserted into counterbores (77', 85').

Figure 16:
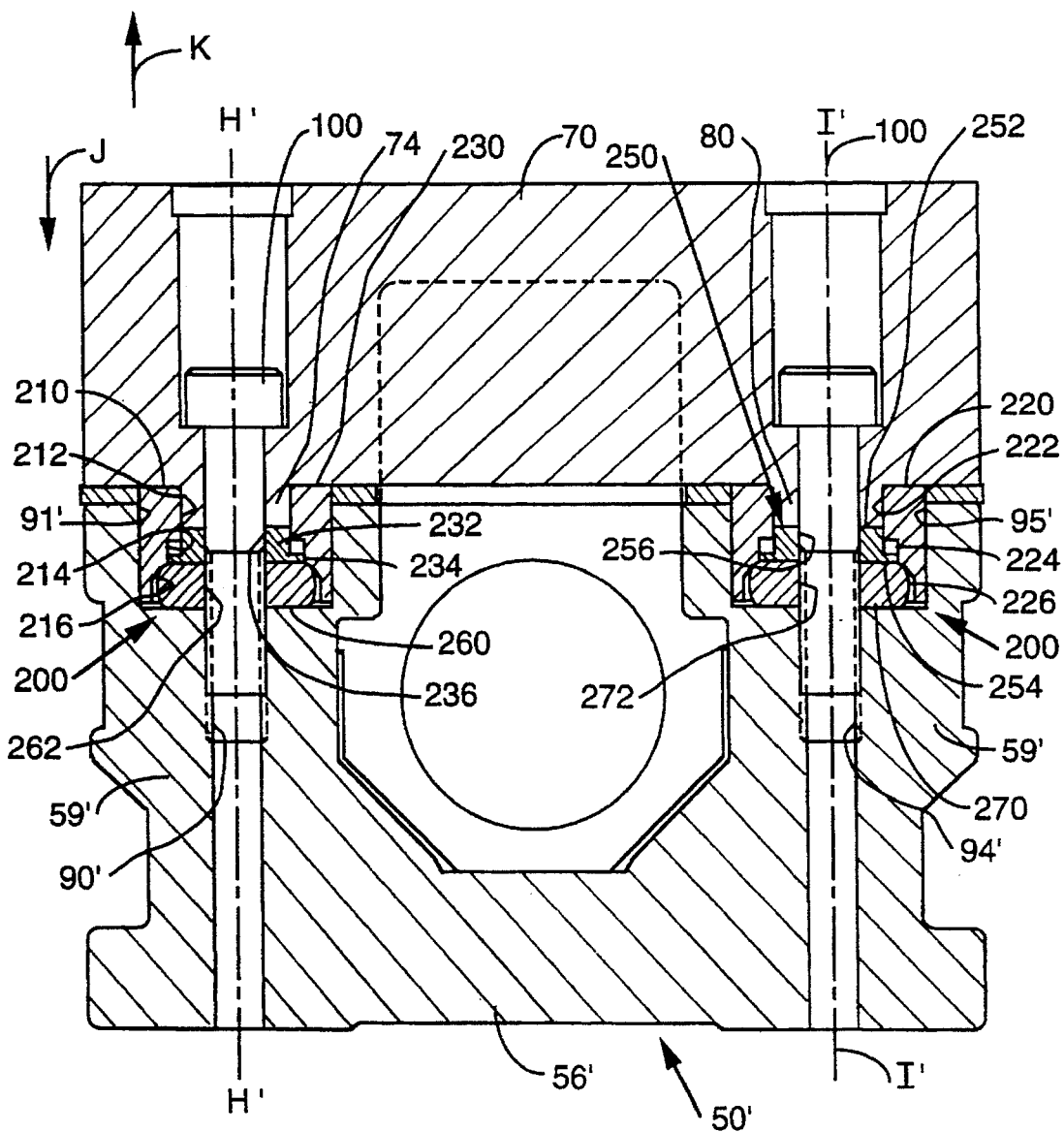
FIG. 16 is a cross-sectional end view of another embodiment of the present invention showing the center jaw thereof rigidly affixed to the base.
Figure 17:
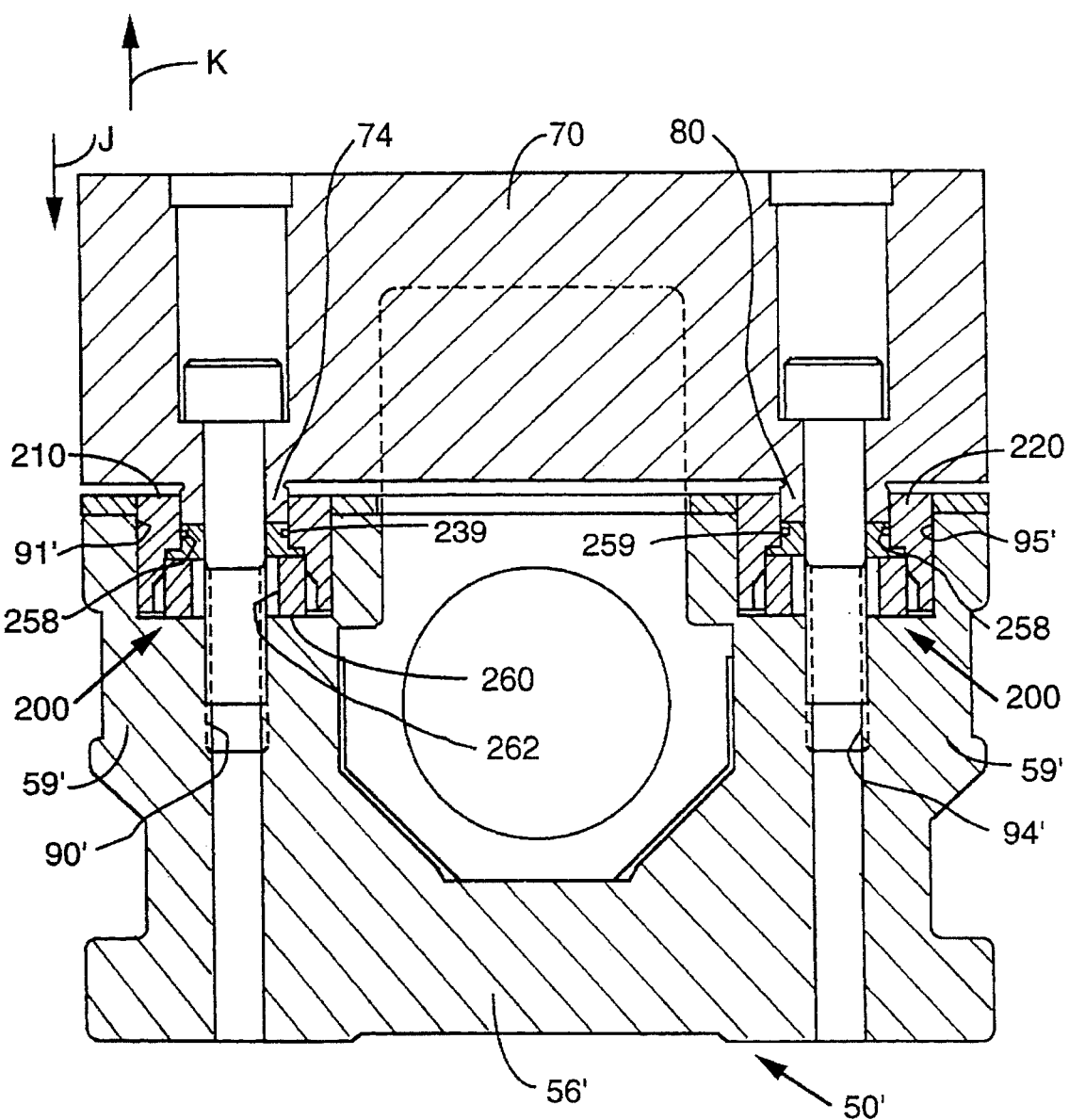
FIG. 17 is a cross-sectional end view of the embodiment of FIG. 16 showing the center jaw thereof biased away from the base after the cap screws have been loosened from the base.

Another embodiment of the present invention is depicted in FIGS. 16 and 17. While this embodiment will be described in connection with a vise-like workholding device 50' of the type discussed above, the skilled artisan will appreciate that this embodiment of the present invention can be used in a variety of other applications wherein objects are fastened together in precise orientations. It will be appreciated that, except for the differences discussed below, the workholding device 50' and components thereof have the same attributes as the workholding device 50 and its various components that were described in detail above. In this embodiment, however, biasing assemblies, generally designated as 200, are utilized to assist in the removal of the fixed jaw member 70 from the base member 56' of the workholding device 50'.

To attach the center jaw 70 to the base 56', a first threaded receiving bore 90' is provided in one rail 59' of the base 56' as was discussed above. Similarly, a second threaded bore 94' is provided through the other rail 59' of the base 56'. A counterbore 91' is coaxially aligned with bore 90' along axis H'—H' and is adapted to receive a hollow bushing 210 therein. Likewise, a counterbore 95' is coaxially aligned with bore 94' along axis I'—I' and is adapted to receive a hollow bushing 220 therein. Bushings (210, 220) are preferably fabricated from hardened steel and are preferably non-rotatably retained within the corresponding counterbores (91', 95') by virtue of an interference fit created between the outer diameter of each bushing (210, 220) and its corresponding counterbore (91', 95'). However, those of ordinary skill in the art will appreciate that bushings (210, 220) may be fabricated from a variety of other suitable materials and may be attached to the side rails 59' by any suitable fastening means, or bores without bushings could be provided in the side rails 59'.

As can be seen in FIGS. 16 and 17, bushing 210 has a series of coaxially aligned bores (212, 214, 216) extending therethrough. It will be appreciated that locating bore 212 is adapted to receive the first protrusion 74 on the jaw 70 therein. Bushing 220 also has a series of bores (222, 224, 226) extending therethrough. It will be appreciated that locating bore 222 is adapted to receive the second protrusion 80 of the fixed jaw 70 therein.

To assist in the detachment of the center jaw 70 from the vise base 56', a flanged plunger member 230 is slidably received within the bores 212 and 214. Plunger member 230 preferably has a hub portion 232 that is sized to be slidably received within bore 212 and a flanged lower portion 234 that is sized to be slidably received in bore 214. A bore 236 sized to slidably receive a cap screw 100 therethrough extends through the plunger member 230 and is coaxially aligned with bores (90', 212, 214, 216). In a preferred embodiment, a groove 238 is provided in the hub 232 for receiving an O-ring 239 therein. The skilled artisan will appreciate that O-ring 239 serves to prevent infiltration of dirt and debris between the hub 232 and bore 212. A second flanged plunger member 250 is slidably received within bores 222 and 224 in bushing 220. Plunger member 250 has a hub portion 252 that is sized to be slidably received within bore 222 and a flanged lower portion 254 that is sized to be slidably received in bore 224. A bore 256 is sized to slidably receive a cap screw 100 therethrough extends through the plunger member 250 and is coaxially aligned with the bores (94', 222, 224, 226). In a preferred embodiment, a groove 258 is provided in the hub 252 that is adapted to receive an O-ring 259 therein.

As can be seen in FIGS. 16 and 17, a spring member 260 that has a bore 262 extending therethrough is sized to be received in bores (212, 214) such that the bore 262 of the spring 260 is coaxially aligned on axis H'—H'. See FIG. 16. Likewise, a spring member 270 that has a bore 272 extending therethrough is sized to be received in bores (222, 224) such that the bore 272 of the spring 270 is coaxially aligned along axis I'—I'. Preferably, spring members (260, 270) are fabricated from an elastomeric material such as urethane; however, spring members (260, 270) may be fabricated from other suitable materials.

To locate the center jaw 70 on the rails 59' of base 56', the center jaw 70 is so positioned such that the mating surface 72 thereof is brought into confronting relationship with the rails 59' of base 56' to enable the first protrusion 74 and the second protrusion 80 to be simultaneously inserted into bushings (210, 220), respectively. To removably attach the center jaw 70 to the rails 59' of base 56', capscrews 100, are preferably inserted through bores (76, 77) in the jaw member 70, the bores (238, 258) in the plungers (230, 250), and the bores (262, 272) in the spring members (260, 270) to threadedly engage threaded bores (90', 94'). As the capscrews 100 are threaded into their bores (90', 94') the bottom surface of each protrusion (74, 80) engages the hub (232, 252) of the corresponding plunger (230, 250) and forces the plunger (230, 250) in the "J" direction thereby compressing the corresponding spring member (260, 270). Bores (226, 256) are sized to accommodate the corresponding spring members (260, 270) in their compressed states. See FIG. 16. When the jaw 70 is to be removed from the base 56', the capscrews 100 are loosened to thereby permit the spring members (260, 270) to urge the jaw member 70 in the "K" direction away from the base 56' thereby facilitating the removal of the jaw member 70 from the base 56'.

Thus, it is evident from the foregoing discussion, that the present invention is well-suited for positioning and fastening a jaw member to the base of a vise-like workholding apparatus. As mentioned above, the present invention enables the jaw member to be removed and replaced should it become damaged or worn. The protrusions of the present invention are machined onto the removable jaw member preferably by the fabricating method described hereinabove. When compared to the locating bushing arrangement disclosed in U.S. Pat. No. 4,968,012 to Haddad et al., which requires very precise machining of the bores in the removable support member and the outer surfaces of the corresponding bushings, the present invention serves to provide a more economical method to accurately removably attach the jaw member to the base of a vise-like workholding apparatus. Thus, numerous other jaw members of various sizes and shapes can be economically manufactured and stored for a variety of other workholding applications. In addition, the present invention facilitates the easy detachment of the jaw from the base.

As such, the present invention provides solutions to the aforementioned problems associated with precisely positioning a member on the planar surface of an object and, in particular, to the positioning problems commonly associated with workholding vises and similar apparatuses. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. Apparatus for facilitating the separation of a member that is attached to an object wherein the member has at least two locating protrusions integrally formed therewith and protruding therefrom that are adapted to be received in corresponding locating counterbores in the object to locate the member in a predetermined orientation relative to the object and wherein the member is removably attachable to the object by threaded fasteners that are adapted to selectively engage and disengage corresponding coaxial threaded bores in the object when said locating protrusions are received in the corresponding locating counterbores, the separation apparatus comprising a plunger member coaxially and slidably received in each said locating counterbore, each said plunger member being coaxially displaceable within said corresponding locating counterbore in response to contact with said locating protrusion received therein; and a spring member received in the bottom of each locating counterbore for biasing said corresponding plunger member and said locating protrusion away from said object when said threaded fasteners are disengaged from said threaded bores.

2. The separation apparatus of claim 1 wherein each said plunger member has sealing means attached thereto for establishing a seal between said plunger and said locating bore to prevent debris from entering therein.

3. The separation apparatus of claim 2 wherein said sealing means comprises:

an O-ring receiving groove provided in each said plunger member; and an O-ring in each said O-ring receiving groove, each said O-ring being sized to contact the interior surface of said corresponding locating bore to create a seal therebetween.

4. The separation apparatus of claim 1 wherein said spring members are fabricated from an elastomeric material.

5. The separation apparatus of claim 4 wherein said spring members are fabricated from urethane.

6. Apparatus for attaching a member onto a planar surface of an object within a predetermined degree of accuracy relative to a reference axis on the planar surface, comprising:

a first receiving counterbore in said planar surface of said object, said first receiving counterbore having a first central axis at a known location extending substantially perpendicularly through said reference axis;

a second receiving counterbore in the planar surface of said object, said second receiving counterbore having a second central axis spaced from said first central axis a first predetermined distance on said reference axis and extending substantially perpendicularly through said reference axis;

a first locating protrusion integrally formed in a mating surface of the member and extending therefrom, said first locating protrusion having a substantially round cross-sectional shape sized for insertion into said first receiving counterbore, said first locating protrusion further having a first axial bore extending therethrough;

a second locating protrusion integrally formed in said mating surface of said member and having a second axial center that is spaced a second predetermined distance from said first axial center of said first locating protrusion such that said first and second locating protrusions may be simultaneously inserted into said first and second receiving counterbores, respectively, said second locating protrusion further having a second axial bore extending therethrough and a noncircular cross-sectional shape configured for insertion into said second receiving counterbore such that the difference between said first and second distances may be greater than said predetermined degree of positioning accuracy while maintaining the ability to simultaneously insert said first and second locating protrusions in said first and second receiving counterbores, respectively, and maintain said predetermined degree of positioning accuracy of the object relative to the reference axis on the planar surface;

fastening members inserted in said first and second axial bores to fasten the object to the member when said first and second locating protrusions are simultaneously received in said first and second receiving counterbores, respectively;

a first plunger member coaxially and slidably received in said first receiving counterbore, said first plunger member being coaxially displaceable within said first receiving counterbore in response to contact with said first locating protrusion;

a first spring member in the bottom of said first receiving counterbore for biasing said first plunger member and said first locating protrusion away from said object when said fastening members are detached from said object;

a second plunger member coaxially and slidably received in said second receiving counterbore, said second plunger member being coaxially displaceable within said second receiving counterbore in response to contact with said second locating protrusion; and a second spring member received in the bottom of said second receiving counterbore for biasing said second plunger member and said second locating protrusions away from said object when said fastening members are detached from said object.

7. The separation apparatus of claim 6 wherein said first plunger member has a first sealing means attached thereto for establishing a seal between said first plunger member and said first receiving bore to prevent debris from entering therein and wherein said second plunger member has a second sealing means attached thereto for establishing a seal between said second plunger member and said second receiving bore to prevent debris from entering therein.

8. The separation apparatus of claim 7 wherein said first sealing means comprises a first O-ring receiving groove provided in said first plunger member and a first O-ring in said first O-ring receiving groove, said first O-ring being sized to contact the interior surface of said first receiving bore to create a seal therebetween and wherein said second sealing means comprises a second O-ring receiving groove provided in said second plunger member and a second O-ring in said second O-ring receiving groove, said second O-ring being sized to contact the interior surface of said second receiving bore to create a seal therebetween.

9. Apparatus for removably attaching a jaw member to a vise-like workholder base within a predetermined degree of accuracy relative to a transverse reference axis on the base, comprising:

a first receiving bore in a known location in said workholder base, said first receiving bore having a first central axis extending substantially perpendicularly through said transverse reference axis, said first receiving bore having a first threaded portion;

a first bushing having a primary axial bore, a primary plunger receiving bore and a primary spring receiving bore coaxially aligned therein, said first bushing attached to said workholder base such that said primary axial bore, said primary plunger receiving bore and said primary spring receiving bore are substantially coaxially aligned with said first receiving bore;

a second receiving bore in said workholder base, said second receiving bore having a second central axis spaced from said first central axis of said first receiving bore on said transverse reference axis a first predetermined distance and extending substantially perpendicularly through said transverse reference axis, said second receiving bore having a second threaded portion;

a second bushing having a secondary axial bore, a secondary plunger receiving bore and a secondary spring receiving bore therein, said second bushing attached to said workholder base such that the secondary axial bore, the secondary plunger receiving bore and said secondary spring receiving bore are substantially coaxially aligned with said second receiving bore;

a first locating protrusion formed in a mating surface of said jaw member and extending therefrom, said first locating protrusion having a plurality of spaced-apart arcuate contact surfaces and being sized for insertion into said first receiving bore, said first locating protrusion further having a first axial bore extending therethrough;

a second locating protrusion formed in the mating surface of the jaw member and having a second axial center that is spaced a second predetermined distance from said first axial center of said first locating protrusion on said transverse reference axis such that said first and second locating protrusions may be simultaneously inserted into said first and second receiving bores, respectively, said second locating protrusion further having a second axial bore extending therethrough and a non-circular cross-sectional shape configured for insertion into said second receiving bore such that the difference between said first and second predetermined distances may be greater than said predetermined degree of accuracy while maintaining the ability to simultaneously insert said first and second locating protrusions in said first and second receiving bores, respectively;

a first fastener having a primary threaded portion sized to extend through said primary axial bore, said primary plunger receiving bore and said primary spring receiving bore to selectively threadedly engage said first threaded portion of said first receiving bore;

a second fastener having a secondary threaded portion sized to extend through said secondary axial bore, said secondary plunger receiving bore and said secondary spring receiving bore to selectively threadedly engage said second threaded portion of said second receiving bore;

a first plunger member coaxially and slidably received in said primary plunger receiving bore, said first plunger member being coaxially displaceable within said primary plunger receiving bore in response to contact with said first locating protrusion;

a first spring member received in said primary spring receiving bore for biasing said first plunger member and said first locating protrusion away from said base when said first and second fasteners are detached from said base;

a second plunger member coaxially and slidably received in said secondary plunger receiving bore, said second plunger member being coaxially displaceable within said secondary plunger receiving bore in response to contact with said second locating protrusion; and a second spring member received in said secondary spring receiving bore for biasing said second plunger member and said second locating protrusion away from said object when said first and second fasteners are detached from said base.

\* \* \* \* \*

UNITED STATES PATENT AND TRADEMARK OFFICE
CERTIFICATE OF CORRECTION

PATENT NO. : 5,623,754

DATED : April 29, 1997

INVENTOR(S) : George R. Swann and Edward S. Paris

It is certified that error appears in the above-indentified patent and that said Letters Patent is hereby corrected as shown below:

In column 12, line 31, delete "separation".

In column 12, line 39, delete "separation".

In column 14, line 32, delete "object" and replace therewith --base--.

Signed and Sealed this

Fifteenth Day of February, 2000

*Attest:*

Q. TODD DICKINSON

*Attesting Officer*     *Commissioner of Patents and Trademarks*